US008644478B2

(12) United States Patent
Souluer (10) Patent No.: US 8,644,478 B2
(45) Date of Patent: Feb. 4, 2014

(54) SYSTEM AND METHOD FOR PROVIDING TELEPHONIC ACCESS TO AN AUDIO STREAM

(76) Inventor: Farid Souluer, Chester Springs, PA (US)

( * ) Notice: Subject to any disclaimer, the term of this patent is extended or adjusted under 35 U.S.C. 154(b) by 1575 days.

(21) Appl. No.: 12/069,567

(22) Filed: Feb. 11, 2008

(65) Prior Publication Data

US 2008/0304636 A1    Dec. 11, 2008

Related U.S. Application Data

(60) Provisional application No. 60/900,559, filed on Feb. 9, 2007, provisional application No. 60/925,797, filed on Apr. 23, 2007.

(51) Int. Cl.
*H04M 3/42* (2006.01)
(52) U.S. Cl.
USPC .............. 379/202.01; 379/101.01; 709/219
(58) Field of Classification Search
USPC .............. 379/202.01, 101.01; 709/204, 219
See application file for complete search history.

(56) References Cited

U.S. PATENT DOCUMENTS

| 5,886,276 | A | * | 3/1999 | Levine et al. ................... 84/603 |
| 6,148,068 | A | * | 11/2000 | Lowery et al. ........... 379/202.01 |
| 7,236,580 | B1 | * | 6/2007 | Sarkar et al. ............ 379/202.01 |
| 7,409,050 | B1 | * | 8/2008 | Li et al. .................... 379/142.01 |
| 7,774,694 | B2 | * | 8/2010 | Watson et al. ................ 715/224 |
| 8,116,236 | B2 | * | 2/2012 | Baird et al. ................... 370/260 |
| 2003/0140121 | A1 | * | 7/2003 | Adams .......................... 709/219 |
| 2005/0050168 | A1 | * | 3/2005 | Wen et al. ..................... 709/219 |
| 2008/0181140 | A1 | * | 7/2008 | Bangor et al. ................ 370/261 |

* cited by examiner

*Primary Examiner* — Duc Nguyen
*Assistant Examiner* — Assad Mohammed
(74) *Attorney, Agent, or Firm* — John F. A. Earley, III; Frank J. Bonini, Jr.; Harding, Earley, Follmer & Frailey, P.C.

(57) ABSTRACT

System for providing telephonic access to an audio stream comprises an audio transmitting apparatus for transmitting the audio stream from its audio source output to a telephone network, and providing more and more control signals for operating more and more audio source controls. A system for providing telephonic access to an audio stream comprises a computer connected to or integral with a first telephone modem, an internet connection, an accessor, an audio stream generator, an audio source output, a controller, and a DTMF interface device for passing the audio stream from the audio connection to a telephone network. System for providing telephonic access to an audio stream comprises one or more audio transmitting apparatuses, a multi switch, a telephone switch, and an audio stream server.

22 Claims, 4 Drawing Sheets

SYSTEM AND METHOD FOR PROVIDING TELEPHONIC ACCESS TO AN AUDIO STREAM

CROSS-REFERENCE TO RELATED APPLICATIONS

This application claims priority to U.S. Provisional Patent Application Ser. No. 60/900,559, filed on 9 Feb. 2007, and U.S. Provisional Patent Application Ser. No. 60/925,787, filed on 23 Apr. 2007.

BACKGROUND OF THE INVENTION

1. Field of the Invention

The present invention relates to accessing audio streams, and systems and methods for providing telephonic access to an audio stream from one or more audio transmitting apparatus(es).

2. Background of the Invention

Today, individuals typically listen to audio streams, such as music, radio programs, sporting event broadcasts, and the like, at locations such as their residences via equipment located at said locations. Examples of such equipment include audio systems, such as home stereo systems, which transmit audio streams such as music from digital audio files, cd's, and tapes. Further examples of such equipment include televisions, including television satellite receivers, digital cable receivers, IPTV (internet protocol television) receivers, radios, including digital radio receivers and satellite radio receivers, and computers, which may be used to transmit audio streams from internet connections and audio streams from files stored on computer hard drives or other peripheral devices connected thereto. Other such equipment for transmitting audio streams includes television satellite boxes and television cable converters.

A drawback of such equipment is that it is often impracticable for users to use such equipment anywhere but where it is installed. For example, a home stereo system used to listen to music on cd's is designed to be installed at a fixed location, such as a home, where its user wishes to use it, and it is impracticable, due to factors such as bulkiness of the system and finding an adequate power supply for operating the system, to carry it with the user to use while the user conducts activities away from the fixed location. Likewise, a satellite dish used to listen to audio and video streams transmitted over free to air (FTA) satellite channels is really too bulky to make it portable. Similarly, programming from sources such as cable boxes, IPTV receivers can only be listened to live by being in proximity to said receivers, which are physically connected to a network.

SUMMARY OF THE INVENTION

It is an object of the invention is to provide access to a myriad of audio streams while away from the audio equipment contained at a fixed location, such as an individual's residence. This may include an audio that is not normally accessible including material available only on satellite or the internet or on local radio stations on the other side of the globe.

This object and other objects are accomplished by providing systems and methods for providing telephonic access to an audio stream, as described below.

BRIEF DESCRIPTION OF THE DRAWING

FIG. 1 is a schematic illustration of the system configured to provide telephonic access to an audio stream from an audio transmitting apparatus, such as a radio, cd player, satellite converter box, cable converter box, computer, television, or the like.

DETAILED DESCRIPTION OF THE PREFERRED EMBODIMENTS

The preferred embodiments of the invention shown herein are illustrative and are not intended to be limiting.

Figure 1:
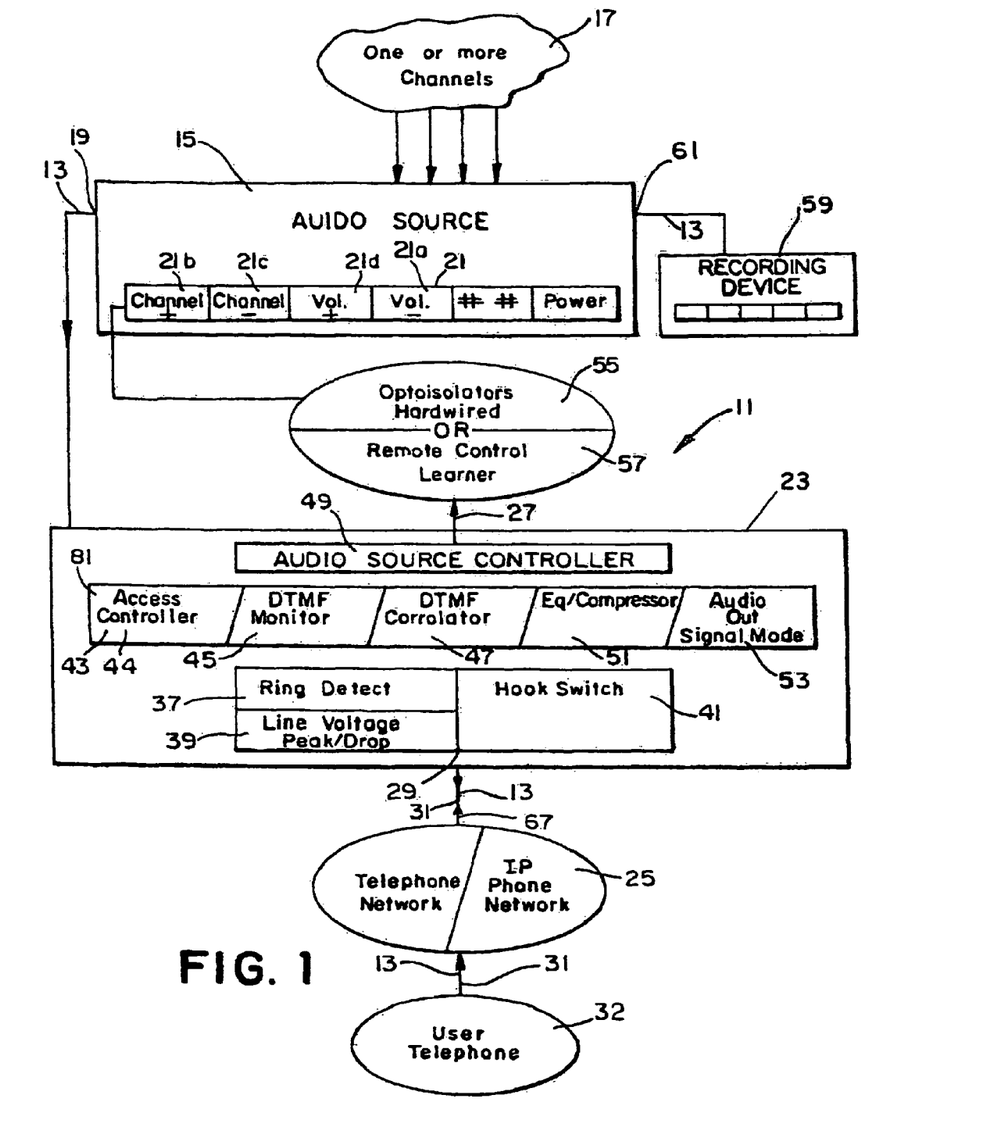

Turning now to the drawings, there is shown in FIG. 1 a system 11 for providing telephonic access to an audio stream 13 using the voice band of the telephone.

The system 11 includes an audio transmitting apparatus 15 for transmitting an audio stream 13. The audio transmitting apparatus 15 may comprise equipment/devices such as audio systems (such as home stereo systems, which transmit audio streams such as music from tapes and cd's), DVD players, VCR's, mp3 players, video receivers (such as analog cable, digital cable, satellite, and IPTV), computers (which transmit audio streams 13 from files stored on computer hard drives or other peripheral devices connected thereto), and the like. The audio transmitting apparatus 15 also may comprise equipment/devices that receive an audio stream 13 and then retransmit the audio stream 13, such as radios, televisions, cable converter boxes, satellite converter boxes, televisions, computers (which may be used to transmit audio streams from internet connections), and the like. In some instances, the audio transmitting apparatus may be integrated with means to access (or be accessed) by a telephone network. An example of such an apparatus may include but is not limited to an IPTV receiver equipped with integrated Voice over IP (VoIP) capability.

The audio transmitting apparatus 15 may have one or more channels 17 of content, each channel may contain specific material, and an audio output 19 for providing a connection to the audio stream 13 from the audio transmitting apparatus 15. The audio transmitting apparatus 15 preferably also has one or more controls 21 for operating the audio transmitting apparatus 15. Examples of controls 21 include a control 21a for providing power to the audio transmitting apparatus 15, controls 21b and 21c for selecting among one or more channels, and/or controls 21d and 21e for adjusting volume level. Alternatively, a channel may be selected using a numeric entry assigned to a particular channel.

The system 11 includes a telephone network interface 29 for establishing a communication circuit 31 with a telephone network/IP phone network 25 (hereinafter sometimes referred to as "telephone network 25") and for bridging the audio stream 13 to the telephone network/IP network 25 using the communication circuit 31. The system 11 also includes a DTMF (dual tone modulation frequency) interface device 23 for monitoring the communication circuit 31 from a caller's telephone 32 via the telephone network/IP phone network 25 through the communication circuit 31, correlating DTMF signals from the caller's telephone 32 against a plurality of predetermined control functions programmed to be recognized by the DTMF interface device 23 or its component parts, and controlling the audio transmitting apparatus 15 by providing one or more control signals 27, responsive to said correlation, to one or more of the controls 21.

In operation, a caller dials a telephone assigned to the telephone network interface 29, the telephone interface 29 detects a ring on the telephone line and establishes a communication circuit 31 with the telephone network/IP phone network 25 and bridges the audio stream 13 from the audio transmitting apparatus 15 to the telephone network/IP network 25 with the communication circuit 31. The DTMF interface device 23 monitors the communication circuit 31 for DTMF signals from the caller's telephone. When the caller sends the DTMF signals, the DTMF signals are monitored and correlated with the predetermined control functions set in the DTMF interface device 23 and used to control the audio transmitting apparatus 15 by providing one or more control signals 27, responsive to the results of the correlation preformed by the DTMF interface device 23, to the one or more controls 21 of said audio transmitting apparatus 15.

In the preferred embodiment shown in FIG. 1, the DTMF interface device 23 comprises a DTMF monitor 45 for detecting the one or more DTMF signals and converting said DTMF signals into a digital signal or code, a DTMF correlator 47 for matching the one or more DTMF signals with a predetermined control function programmed in the device 23, and a controller 49 for effecting operation of the audio transmitting apparatus 15 by generating and sending control signals 27, in response to the matching of signals by the correlator 47, to the one or more the controls 21. The DTMF monitor 45 may be of the type produced by Mitel model MT8870, or an equivalent, such as those manufactured by Holdtek and Motorola. Ideally, the DTMF monitor 45 is configured for momentary output.

Preferably, the telephone network interface 29 of the system 11 includes a hook switch 41 for opening or closing the communication circuit 31 with the telephone network 25, a ring detector 37 for detecting a signal from the telephone network/IP phone network 25 when an incoming call occurs at the telephone network 25 and communicating to close the hook switch 41, and a line voltage peak/drop detector 39 for detecting a line drop and communicating to operate the hook switch 41.

Preferably, the DTMF interface device 23 further comprises an access controller 43 for allowing or denying access to the DTMF interface device 23 and/or the audio stream 13. The access controller 43 may comprise a caller id detector 44 for identifying the telephone number of the caller's telephone 32, and further may comprise an access permission table for determining whether the telephone number is authorized. Alternatively, the access controller 43 may comprise a DTMF monitor 45 for monitoring the communication circuit 31 for an access signal, and DTMF correlator 47 for correlating an access signal with the access permission table of the DTMF interface device 23.

In use, a caller may dial a telephone line or IP phone line 67 assigned to be connected to the telephone network interface 23. The ring detector 37 detects the incoming call from the telephone network/IP phone network 25 and communicates to close the hook switch 41, thereby establishing the communication circuit 31 with the telephone network/IP phone network 25. The DTMF interface device 23 monitors the communication circuit for DTMF signals from the caller's telephone 32 transmitted via the telephone network/IP phone network 25. Once DTMF signals are sent from the caller's telephone 32, the DTMF signals transmitted by the caller are correlated with a predetermined control function programmed in the DTMF interface device 23, and that predetermined control function is then executed to control the audio transmitting apparatus 15 by providing one or more control signals 27 to the one or more controls 21 of the audio transmitting apparatus 15.

Optoisolators 55 may be used to provide communication between the DTMF interface device 23 and the audio transmitting apparatus 15. If the audio transmitting apparatus 15 communicates with the DTMF interface device 23 via optoisolators 55, control signals 27 are sent to the one or more optoisolators 55 which then send responsive signals to the audio transmitting apparatus 15 to operate the individual controls 21 of the audio transmitting apparatus 15.

If there is an access controller 43 installed, and the access controller 43 is of the type that utilizes the DTMF access code, the DTMF interface device 23 monitors the communication circuit 31 for the DTMF access code, the user/caller provides the access code, the DTMF access code is compared against an access permission table, and if a match is made and access is granted, the communication circuit 31 bridges with the audio stream 13 from the audio transmitting apparatus 15. Alternatively, access control may be by a caller id circuit 44 that obtains the caller's telephone number and compares it against an access permission table set in the DTMF interface device 23, and if access is granted, the hook switch 41 closes to establish the communication circuit 31.

The system 11 further comprises an equalizer/compressor 51 for normalizing signals from the audio output 19 to provide optimal sound quality. The system 11 may further comprise an output signal reducer/muter 53 for muting signals from the output 19 when a DTMF signal from a caller is detected by the DTMF interface device 23. Alternatively, the equalizer/compressor 51 may be used to momentarily reduce/mute the audio output 19 when a DTMF signal from a caller is detected by the DTMF interface device 23. This may be accomplished, preferably, using circuitry, software, or a combination thereof.

The individual components of the system 11 (the DTMF interface device 23, the DTMF monitor 45, the DTMF correlator 47, the controller 49, the equalizer/compressor 51, the output signal reducer/muter 53, and the others mentioned above, for example) may be individual components or bound up in one circuit, one chip, or a combination thereof, or the functions of the individual components discussed above may be performed with a computer with appropriate software installed.

In a preferred embodiment of the invention, the audio transmitting apparatus 15 may be controlled by a plurality of optoisolators 55 connected to the transmitting apparatus 15 and disposed to receive the one or more control signals 27 from the DTMF interface device 23 and send responsive signals 48 to the one or more controls 21.

Alternatively, the audio transmitting apparatus 15 may be controlled with a remote control learner circuit 57, dispose to receive the one or more control signals 27 from the controller 49 and send responsive signals 48 to the one or more controls 21 of the transmitting apparatus 15.

A recording device 59 may be used to record an audio stream 13 from an audio or audio/video output 61 of the audio transmitting apparatus 15, with the recording device 59 initiating recording of the audio stream 13 from the output 61 of the audio transmitting apparatus 15 in response to one or more control signals 27 from the DTMF interface device 23—be it through optoisolator connection 55, or via a remote control learner circuit 57—to the audio transmitting device 15, which is in communication with the recording device 59. The recording device 59 may also be integral with the audio transmitted apparatus.

Figures 2, 4:
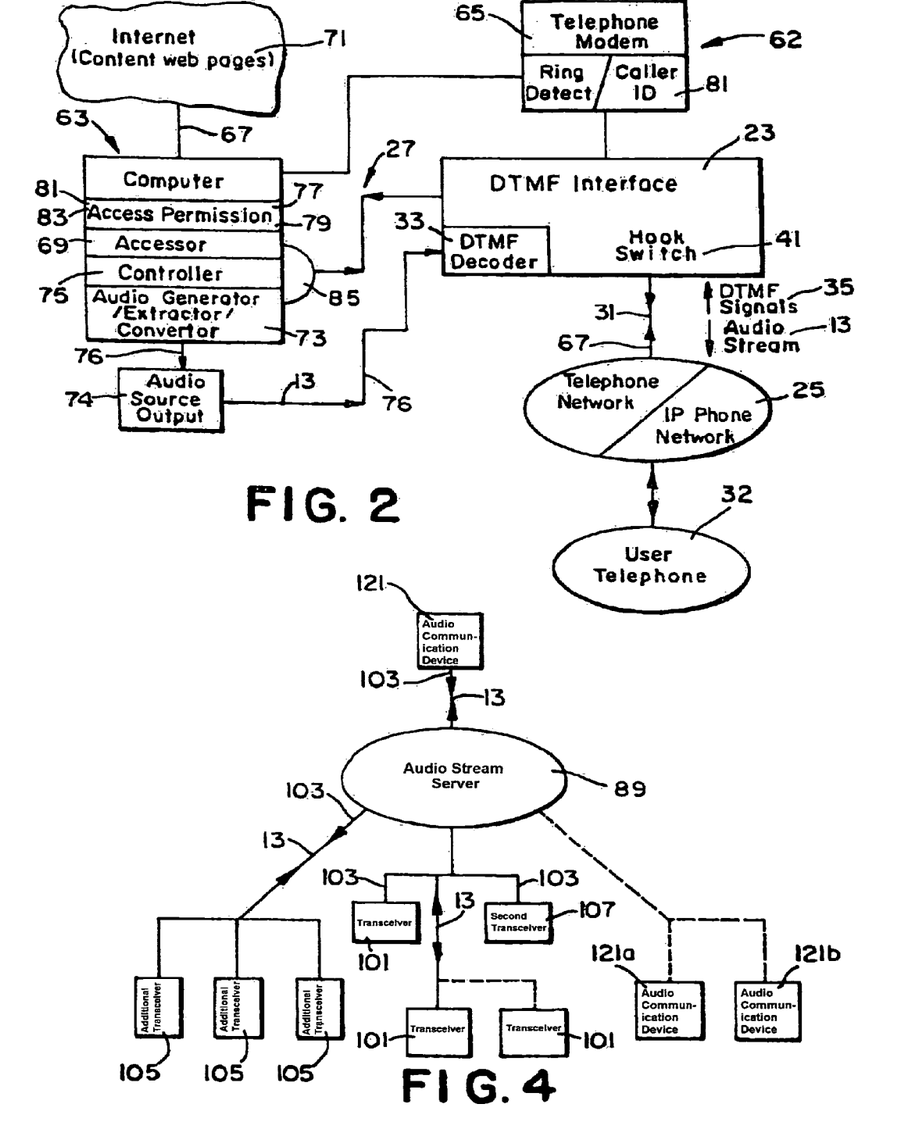
FIG. 2 is a schematic illustration of the system disposed to provide telephonic access to an audio stream originating from a computer.
FIG. 4 is a schematic illustration of another alternative embodiment of the invention illustrating a method and system of broadcasting an audio stream.

Referring now to FIG. 2, there is shown a system 62 for providing telephone access to an audio stream 13. A computer 63 is connected to or integral with a first telephone modem 65. The computer 63 has an accessor 69 for allowing the computer 63 to access content 71 via an internet connection 67. (The first telephone modem 65 may be omitted and an IP phone modem may be used in place of the first telephone modem 65. With this configuration a telephone line is unnecessary. In this alternative embodiment where the first telephone modem 65 is replaced with an IP phone modem, the communication in and out of the system may be accomplished by using broadband network connection.) The accessor 69 preferably is software or code designed to interact with commercially available internet browsing software such as Internet Explorer, Safari, and Itunes to access content via the internet or the storage devices accessible by the computer. If the computer 63 is a DVR or IPTV receiver the appropriate native software protocols are employed to access content by the accessor 69.

The system 62 further comprises an audio stream generator/extractor/converter 73 for generating/extracting/converting an audio stream 13 from said content 71. The computer 63 of the system 62 further comprises an audio source output 74 for providing an audio connection 76 to the audio stream 13. The computer 63 also comprises a controller 75 for selecting the content 71 and/or adjusting volume level of the audio stream 13. The system 62 further comprises a DTMF interface 23 for passing the audio stream 13 from the audio source output 74 to a telephone network/IP phone network 25 and for providing one or more command/control signals 27 to the controller 75. The DTMF interface device 23 preferably comprises a hook switch 41 for (a) establishing a communication circuit 31 with the telephone network 25 or IP phone network, and/or (b) bridging the audio stream 13 with the communications circuit 31. The DTMF interface device 23 further comprises a DTMF decoder 33 for monitoring the communications circuit 31 for DTMF signals 35, reading said signals, and translating the DTMF signals 35 into a command code or signal/control signal 27 for use by the computer 63 and/or the controller 75. The various components may be part of the computer or separate components linked to one another.

In use, a caller, through the telephone network/IP phone network 25, dials into a telephone line or IP phone line 67 assigned to the first telephone modem or IP phone modem 65 and/or DTMF interface 23 or the computer 63, the first telephone modem 65 and/or the computer 63 detects a ring on the telephone line 67 and passes a control signal 27 to the DTMF interface device 23, which operates a hook switch 41 to open the communications circuit 31. Thereafter, the DTMF decoder 33 monitors the communications circuit 31 for DTMF signals 35 from the caller's telephone 32 and translates said DTMF signals into a command/control signal 27 for use by the controller 75, which is programmed to select or direct the accessor 69 to select among the one or more web pages/content 71 or adjust the volume level of the audio stream 13. The communications circuit 31, being connected to the audio connection 74 passes the resulting audio stream 13 back to the caller via the communications circuit 31 of the telephone line 67 of the telephone network/IP phone network 25.

The system 62 may further comprise an authenticator 77 for determining whether to allow access to the audio stream 13 or communication circuit 31. The authenticator 77 may be configured in multiple ways to allow or disallow access to the audio stream. The following are exemplary. In one exemplary embodiment, the system 62 includes an access permission table 79 and a caller identification detector 81 which may be integral with the telephone modem/IP phone modem 65 or the computer 63, or the DTMF interface device 23. As another example, as illustrated in FIG. 2, the authenticator 77 comprises the DTMF access code prompter 83 and an access permission table 79 whereby the DTMF access code prompter 83 requests the access code from the user telephone 32 (the caller) (using an audio file for example or some other audio or digital indicia sent to the user telephone 32 (the caller) via the communication circuit 31), the DTMF decoder 33 of the DTMF interface device 23 reads the access code transmitted from the user telephone 32 in response to the access code request and passes said access code or its digital equivalent to the computer 63 for comparison with the access permission table 79. Preferably, the DTMF interface device 23 is connected to the telephone line 67 and connected to a control port 85 of the computer 63, configured to receive the command/control signal 27 for operation of the hook switch 41 to open the communication circuit 31 and configured to bridge the audio stream 13 with said communication circuit 31 via the audio connection 76 or the control port 85.

Figure 3:
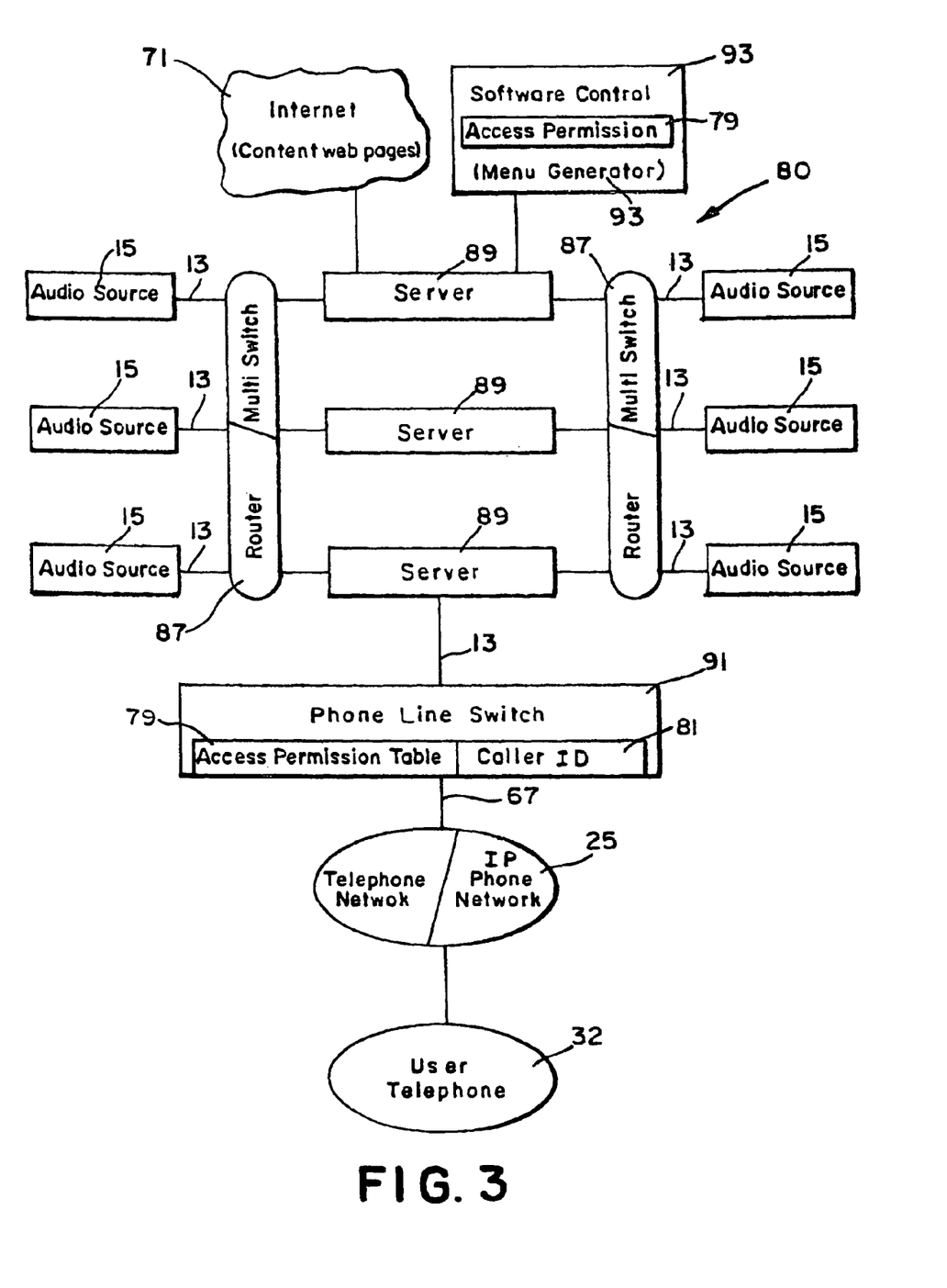
FIG. 3 is a schematic illustration of a server based system providing audio streams from multiple types of audio transmitting apparatuses to multiple users.

Turning now to FIG. 3, there is shown a system 80 for providing telephonic access to an audio stream 13. The system 80 comprises one or more transmitting apparatus(es) 15 providing one or more audio streams 13, one or more multi-switches/routers/switchers 87 connecting one or more audio streams 13 from the one or more audio transmitting apparatuses 15 with at least one audio stream server 89, and a telephone switch/phone line switch/IP phone switch 91 for connecting the at least one audio stream server 89 with one or more telephone lines/IP phone lines 67.

In operation, a caller accesses a telephone line/IP phone line 67 and dials a telephone number designated to be received by the telephone switch 91, the switch 91 connects the telephone line 67 with the at least one audio stream server 89, and the at least one audio stream server 89 accesses a desired audio stream 13 from the one or more audio streams 13 via the multi-switch/router/switcher 87. The system 80 may be controlled at least in part by software. The at least one audio stream server 89 accesses a desired audio stream 13 from the one or more audio streams 13 of the one or more transmitting apparatus(es) 15 via the multi-switch/switcher/router 87 and connects the desired audio stream 13 with the telephone line 67. This application allows for public pool type chatting by connecting multiple callers together by which they may communicate. The chatting pools may be topic based, language based, geographically based, etc. Callers may enter a chatting pool by connecting to a particular audio stream 13 or to a server or to the internet via the inventive systems.

In addition, the system 80 may be configured to access the internet for content or web pages 71, similar to the configuration elsewhere described herein.

The system 80 may control access using a caller identification detector 81 and an access permission table 79. Alternatively, the system 80 may allow or disallow access on the basis of requesting an access code and comparing said access code with an access permission table 79, similar to that described above.

The system 80, alternatively, may have a menu generator 93 for providing the caller with a selection of audio streams 13 and corresponding DTMF key (1-2-3, or some other number) by which the caller may press to select the desired audio stream 13 from the selection of audio streams 13.

Preferably, the audio transmitting apparatuses 15 of the system 80 in the preferred embodiment of the invention illustrated in FIG. 3 are satellite receivers, which may be, for example, used to receive audio streams 13 transmitted over FTA satellite channels, and/or computers which have desired web sites open on them for accessing the audio stream 13 emanating therefrom. IPTV receivers may also be employed to access content. Accordingly, each subscriber to the system 80, being provided with his own phone line to gain access to the system 80, may access via a phone, such as a cell phone, audio streams 13 emanating from broadcasts transmitted via satellite and from internet web sites. Access to such audio streams no longer requires the person desiring such access to have a satellite receiver or a computer with him to receive and transmit such audio streams for listening.

The system 80 of the invention also enables people who want to broadcast audio programming to reach a potential audience anywhere phone service reaches, without spending large sums of money to obtain FCC licenses and to invest in expensive equipment. Accordingly, each such broadcaster, after creating an internet web site from which to broadcast an audio stream 13 over the internet and connecting his web site to the inventive system 80, may broadcast an audio stream 13 over the internet, and his audience may listen to the broadcaster's broadcast by accessing the audio stream 13 by phone via the system 80. This especially benefits small demographic groups that have not been adequately served with programming due to the high costs of broadcasting programming using conventional means, such as radio broadcasting and satellite radio broadcasting, which have made it uneconomical to provide programming to small demographic groups. Because the costs of broadcasting in accordance with the invention are small compared to those of radio or satellite broadcasting, it is economically feasible to provide programming directed at small demographic groups in accordance with the invention using the system 80.

Referring to FIG. 1, the present invention is used to provide telephonic access to an audio stream 13 by providing an audio transmitting device 15. The audio transmitting device 15 has one or more channels 17 for providing an audio stream 13, and an audio source output 19 for conveying the audio stream 13 to a DTMF interface device 23. The audio transmitting apparatus 15 further has one or more controls 21 for powering the audio source 15, selecting among the one or more channels 17, and/or adjusting volume level. The method further comprises establishing a communication circuit 31 between the DTMF interface device 23 and a caller's telephone 32 by a telephone network/IP phone network 25 and passing the audio stream 13 to the communications circuit 31 and operating the one or more controls 21 with the caller's telephone 32.

The step of establishing a communication circuit 31 may comprise detecting an incoming call from the telephone network/IP phone network 25 and operating a hook switch 41 to complete the communications circuit 31. The passing the audio stream 13 to the communication circuit 31 may further comprise bridging the audio source output 19 with the communications circuit 31. The communication circuit 31 may be monitored for one or more DTMF signals 35 using a DTMF monitor 45. The monitored DTMF signal 35 is then correlated with a control function with the DTMF correlator 47. The control function is then translated into a control signal 27, which is sent to the one or more controls 21. When a call drop is detected, the hook switch 41 is operated to close the communication circuit 31.

As a means of access control, preferably, the passing step is predicated on first allowing or denying the communication circuit 31 access to the DTMF interface device 23 and/or the audio stream 13. This may comprise reading a caller identification number associated with the user telephone 32 with a caller identification circuit 81 and comparing it with an access permission table. Alternatively, access may be controlled by reading a DTMF access code supplied by the user telephone 32.

The audio stream 13 provided at the audio source output 19 may be normalized or compressed or equalized to provide for optimal audio quality. Preferably, the DTMF interface device 23 is configured such that the audio source output signal 19 is momentarily reduced when a DTMF signal 35 is detected. In a preferred embodiment, the controls 21 are operated by being connected to optoisolaters 55 that are disposed to receive the one or more control signals 27, and to send responsive signals 56 to the one or more controls 21. Alternatively, the controls 21 be operated by a remote control learner circuit 57 disposed to receive the one or more control signals 27 and send responsive signals 56 to the audio transmitting apparatus 15. Ideally, the remote control learner circuit 57 acts as a universal remote control configured to communicate with the audio transmitting apparatus 15.

In accordance with the preferred embodiment, the audio stream 13 may be recorded by a recording device 59. The recording step may be initiated by one or more DTMF signals 35 sent from the caller's telephone 32. The recorder device 59 also may be configured to record a video stream in addition to the audio stream 13 provided to the DTMF interface device 23, provided that the audio transmitting apparatus 15 has a video source as well. This audio/video source recording may also be initiated by the step of the caller's telephone 32 providing DTMF signals 35 upon which the DTMF interface device 23 acts to initiate recording by the recording device 59 by sending control signals 27 from the DTMF device 23 to the audio transmitting apparatus 15 or the recording device 59.

Turning now to FIG. 2, in accordance with an alternative embodiment, access to an audio stream 13 is achieved by providing a computer 63 connected to or integral with the first telephone modem/IP phone modem 65. Next, a communication circuit 31 is established with the telephone network/IP phone network 25. The computer 63 then accesses content 71 by the internet connection 67 or content 71 may be accessed from the computer 63 drive itself or any other connected computers 63 or other devices that are connected to the computer 63. Next, the content 71 is generated, extracted and/or converted into an audio stream 13, and the audio stream 13 is then bridged with the communications circuit 31.

The communications circuit 31 is monitored for one or more DTMF signals 35, and once a DTMF signal 35 is present, the DTMF signal 35 is read and translated into a command/control signal 27, thus allowing for the selection of the content and/or adjusting the volume level of the audio stream 13 of the audio transmitting apparatus 15.

Access may be allowed or disallowed to the communication circuit 31 or the audio stream 13. This may be achieved by or accomplished by a caller identification detector 81 and an access permission table 79, wherein the telephone number of the user telephone 32 is detected and compared with the access permission table to determine whether access should be denied or granted by the system. Alternatively, the step of allowing or disallowing the access may comprise prompting a caller for an access code either using an audible recording or some digital equivalent, reading the access code and passing the access code, or digital equivalent of the access code, to the computer 63 or other hardware for comparison with an access permission table 79, thereby making a decision whether to allow or disallow access to the communication circuit 31 or the audio stream 13.

Referring to FIG. 3, providing telephonic access to an audio stream 13 comprises providing one or more audio streams 13 from one or more audio transmitting apparatuses 15, connecting the one or more audio streams 13 from the one or more audio transmitting apparatuses 15 with at least one audio stream server 89, and connecting at least one audio stream server 89 with one or more telephone lines 67, thereby passing the audio stream 13 from the one or more audio transmitting apparatuses 15 to the audio stream server 89 which passes the audio stream 13 to the telephone line 67. The one or more audio streams 13 from the one or more audio transmitting apparatuses 15 may be connected to a telephone line 67 using a multi-switch/router/switcher 87 which handles the passing of the audio stream 13 from the audio transmitting apparatus 15 to the server 89. The connecting of the at least one audio stream server 89 with one or more telephone lines 67 step may be accomplished using a telephone switch or IP phone switch or a phone line switch 91, whereby a user may access a user telephone 32 and dial a telephone number that is designated to communicate with the telephone switch 91. The user may then select an audio stream by pressing keys on the user telephone 32.

As discussed above, access may be granted or denied, and may be accomplished with a caller identification detector 81 and an access permission table 79 wherein the telephone number associated with the user telephone 32 is identified and compared against an access permission table which may be integral with the software control 93 or the phone line switch 91 or the server 89 so as to determine whether access is allowed or disallowed, that access being to the audio stream 13 that is passed from the audio transmitting apparatus 15 to the phone line switch 13. Alternatively, the step of allowing or disallowing access may comprise prompting a caller for an access code either using audio or video or some digital equivalent text, for example, reading the access code, using the phone line switch 91, the software control 93 or the server 89 or any other combination which is capable of reading the access code and comparing it with an access permission table 79. This includes passing the access code or digital equivalent of the access code for comparison with the access permission table.

The embodiment of the system shown in FIG. 3 may be configured to be a stand alone system, wherein the system is owned and operated by an individual who programs the desired content to be accessed with a cell phone or telephone. This may ease privacy concerns that a user of a subscriber version of the system shown in FIG. 3 may have, because the user of a stand alone version will be in control of the audio streaming service, rather than a central office.

Each of the systems described herein may be provided with a call back device as part of the telephone interface or switch to enable the system to call the caller/user back if the system is pinged by a caller, by calling, by text message, by email or the like, to transmit the audio stream 13 as an incoming call to the user, if desired. This is advantageous when the user's telephone plan does not charge for incoming calls.

If the caller to any of the systems of the invention uses a cell phone, the caller may use an FM receiver/transmitter, or, alternatively, a cable, to make a connection between his phone and the speakers of an audio system (e.g., a car's audio system (e.g., radio)) to access the audio stream 13 transmitted from any of the systems of the invention.

In another alternative embodiment shown in FIG. 4, a system is provided for enabling broadcasting and chatting functions utilizing cell phones or other telephonic devices. As illustrated by FIG. 4, a method of broadcasting an audio stream comprises connecting an audio communications device 121 (such as an audio source like IPTV, an internet source, etc., that produces audio stream 13) with an audio stream server 89. The audio communications device 121 may be a cell phone, a telephone, a computer, the audio transmitting apparatus 15, or any combination thereof. The audio communications device 121 provides the audio stream server 89 with an audio stream 13 by sending signals to the audio stream server 89, and the audio stream server 89 provides audio streaming services to the transceiver(s) 101. The audio stream server 89 also may provide audio streaming services to other audio communications devices 121*a*, 121*b* (for simplicity, only two such audio communications devices are shown, but the number of such may be more or less than that shown). The audio stream server 89 is capable of handling multiple connections 103 between the audio communications device 121 and audio transceivers 101. The audio stream server 89 is further capable of managing and executing the receipt and transmission of audio streams 13. For example, this is accomplished by transmitting the audio stream 13 from the audio communications device 121 to the audio stream server 89, connecting an audio transceiver 101 with the audio stream server 89 via a telephonic connection 103, and passing the audio stream 13 from the audio stream server 89 to the audio transceiver 101 via the telephonic connection 103. Other transmission means can be utilized based on what devices are used as transceivers 101. If the transceiver 101 is a broadband compatible device (e.g., an internet capable computer, wifi capable phones, internet capable phones, etc.), broadband connection may be used. The audio stream 13 from a broadcaster passes from the audio communications device 121 to the audio stream server 89, the audio stream server 89 connects with an audio transceiver 101 via the telephonic connection 103, and the audio stream 13 is then passed to the audio transceiver(s) 101. The audio communications device 121 may itself be a transceiver 101, and said transceiver 101 may be a phone, cell phone, computer, or other communications device as discussed herein.

The method may further comprise producing an audio stream 13 to be transmitted by the audio communications device 121, capturing the audio stream 13 electronically, and passing audio stream 13 to the audio communications device 121.

The steps of producing and capturing the audio stream 13 to be transmitted may comprise speaking into a microphone, the microphone being attached to the audio communications device 121 for capturing audio from a speaking individual live in real time.

The method may further comprise the steps of connecting a second transceiver 107 with the audio stream server 89 with a telephonic connection 103, and passing the audio stream 13 from the audio communications device 121 via the audio stream server 89 to the second transceiver 107 via the telephonic connection 103, so to permit the audio stream 13 from the audio communications device 121 to be passed to the transceiver 101 and to the second transceiver 107.

Alternatively, to enable a chat function the audio communications device 121 may comprise the transceiver 101 and a second transceiver 107, said transceiver 101 and second transceiver 107 being connected to the audio stream server 89 and capable of transmitting an audio stream 13 to the audio stream server 89 and receiving the audio stream 13 from the audio stream server 89 to allow each transceiver 101/107 to chat with another of the transceivers 101/107 via the connection with the audio stream server 89. The transceiver 101 and the second transceiver 107 may be telephones or cell phones. They may also be computers.

Alternatively, the audio communications device 121 may further comprise a plurality of additional transceivers 105, said additional transceivers 105 being capable of connecting to the audio stream server 89 and capable of transmitting an audio stream 13 to the audio stream server 89 and receiving the audio stream from the audio stream server 89 to allow each of the additional transceivers 105 (which also may be telephones, cell phones, or computers) to chat with the other of the additional transceivers 105 via the connection 103 with the audio stream server 89.

Transceiver 101, second transceiver 107, and a plurality of additional transceivers 105 are connected to the audio stream server 89 and transmit an audio stream 13 to the audio stream server 89. The audio communications device 121 receives the audio stream 13 from the audio stream server 89 to allow users the transceiver 101, the second transceivers 107, and the additional transceivers 105, to chat with each other via the connections 103 with the audio stream server 89.

The plurality of additional transceivers 105 may be telephones and/or cell phones. The plurality of additional transceivers 105 may also comprise any combination of telephones, cell phones, or computers.

The audio communications device 121 may comprise a computer, the computer being attached to or integral with the microphone for capturing the audio from a speaking individual.

The computer may further comprise a connection and means for capturing audio that is prerecorded, and, may further comprise the step of capturing the audio that is prerecorded.

The audio communications device 121 also may be any combination of a transceiver 101, a second transceiver 107, a plurality of additional transceivers 105, a computer, or any combination thereof, as well as being a broadcasting source as previously mentioned.

The method may further comprise the steps of connecting a plurality of additional transceivers 105 with the audio stream server 89 with a telephonic connection, and passing the audio stream 13 from the audio communications device 121 via the audio stream server 89 to the plurality of additional transceivers 105 via the telephonic connection to permit the audio stream 13 from the audio communications device 121 to be passed to the plurality of additional transceivers 105.

The transceiver 101, the second transceiver 107 and the plurality of additional transceivers 105 may be telephones or cell phones.

The method may further comprise receiving a request to access an audio stream 13 from one of the telephones or cell phones.

The request may be received by detecting a signal made by depressing a button on the one of the telephones or cell phones or by detecting speech made by a user speaking into the one of the telephones or cell phones, or by detecting a ring on the telephonic connection that connects the telephones or cell phones with the audio stream server 89.

The method may further comprise determining whether to pass the audio stream to the one of the telephones or cell phones. The determining step may comprise receiving a signal made by depressing a button on the one of the telephones or cell phones or by detecting speech made by a user speaking into the one of the telephones or cell phones, and comparing the signal made by depressing a button on one of the telephones, or speech made by a user speaking into one of the telephones or cell phones with an access permission table to ascertain whether said signal or speech matches or does not match any said signals or speech that are listed on the access permission table.

Alternatively, the determining step may comprise receiving a caller identification number associated with the user telephone, and comparing the caller identification number with an access permission table using a piece of code or circuit or some combination thereof to ascertain whether the caller identification number matches or does not match any of the numbers listed on the access permission table.

Connecting an audio transmitting apparatus with an audio stream server may establish an internet connection between the audio transmitting apparatus and the audio stream server.

The method may further comprise normalizing, equalizing, compressing, amplifying or muting the audio stream to provide optimal sound quality to and from the telephones or cell phones.

The method may further comprise passing the audio stream from the user telephone to an external speaker. This may be accomplished using a myriad of methods known in the art involving hardwire and/or software.

The step of connecting the telephones or cell phones with the audio stream server may be accomplished with a telephone switch.

The method may further comprise providing a description of the content of the audio stream for use in a menu for presentation, in a display and/or by audible menu to an individual so the individual may know what content is being broadcasted.

The description provided may be intentionally chosen to be blank (e.g., no description given for the content of the audio stream).

In accordance with my invention, a method of broadcasting may comprise the steps of assigning a plurality of channels to an audio stream server 89, the audio stream server 89 providing audio streaming services to audio communications device 121 and audio transceivers 101/107/105 connected thereto by being capable of handling connections to a audio communications device 121 and to audio transceivers 101/107/105 and further capable of managing and executing the receipt and transmission of audio streams 13, one or more channels of the plurality of channels for receiving one or more audio streams 13 transmitted from one or more transceivers 101/105/107 that are connected to one or more channels, and the one or more channels of the plurality of channels for passing the audio streams 13 that are transmitted to the one or more channels of the audio stream server 89 to the one or more transceivers that are connected to said one or more channel.

The one or more transceivers 101/107/105 are connected with a first channel of the plurality of channels. The audio stream server 89 receives the audio stream transmitted from the one or more transceivers that are connected to the first channel, and passes the audio stream 13 transmitted from the one or more transceivers 101/105/107 that are connected to the first channel. In this configuration, any of the one or more transceivers 101/105/107 that are connected to the first channel of the audio stream server 89 are capable of transmitting an audio stream 13 to the audio stream server 89 and receiving any audio stream 13 that is transmitted to the first channel of the audio stream server 89.

The method may further comprise providing a description of the content of the audio stream 13 for use in a menu for presentation, in a display and/or by audible menu, to an individual so an individual may know what content is being broadcasted on a particular channel of the plurality of channels.

The description provided may be intentionally chosen to be no description. The method may further comprise receiving a request from the one or more transceivers 101/105/107, directed to the audio stream server 89, to connect with a particular channel of the plurality of channels, or to change from a particular channel of the plurality of channels to another channel of the plurality of channels of the audio stream server 89.

The one or more transceivers 101/105/107 may comprise cell phones or telephones, or a computer equipped with audio transmitting and receiving hardware, or any combination or multiples thereof.

Audience size is important in connection with the economics of conventional broadcasting. Generally, conventional broadcasting targets mass market audiences to obtain a large audience that is attractive to sponsors to advertise to via the conventional broadcasting for a fee, or, in the case of satellite radio such as XM Radio or Sirius Radio, to obtain a large audience of subscribers willing to pay subscription fees to create sufficient revenue for the satellite radio company to operate. Generally, conventional broadcasting does not serve non-mass market audiences with programming due to the high cost associated with conventional broadcasting.

In accordance with the invention, the non-mass market may be served with programming. The non-mass market includes audiences generally seen by conventional broadcasting as too small to economically provide service to. Non-mass market audiences may include audiences interested in topics such as chess, boats, cars, and Shakespearean plays, to name a few of such topics, or such audiences may include specific ethnic groups looking for specific ethnic programming. In accordance with the invention, it is economically feasible to target programming for all sized market groups (mass market groups and non-mass market groups), thereby creating an overall audience in the form of subscribers that collectively is large, it being comprised of all sized market groups added together.

In accordance with the invention access to any radio station or the audio portion of any television broadcast (or web-cast), is enabled from any telephone, cell phone, or VoIP phone. Subscribers may listen to any channel, anywhere, any time, and at a reasonable cost, using existing cellular networks.

The four principal business functions of in connection with the system of the invention are to provide service, acquire audio content or provide for "cell-casting", acquire subscribers, and perform administrative functions including billing, collection, and customer service.

The market size for the service is conservatively estimated at about 10 million subscribers, or 5% of the approximately 200 million cell phone users in the United States. Worldwide, that number may easily exceed 100,000,000 by 2010.

The content is to be acquired from the tens of thousands of broadcast radio or television and satellite or Internet channels that are currently in operation throughout the world. As of June 2004, FCC alone had licensed over 12,000 radio channels to broadcast within United States. In addition, there are thousands of ethnic radio and television channels, which operate on medium powered satellites without requiring a FCC license.

The incentive for networks such as Verizon Wireless, Cingular and TMobile is the substantial incremental revenues that could be realized by these service providers; without any new expenditure towards upgrading their networks.

The initial strategy is to focus on affinity and ethnic market segments. They represent about one-third of the market. Over time, inventions disclosed herein can also become the delivery medium of choice for groups, regardless of size, who wish to regularly cell-cast to their members. The average monthly recurring charge (MRC) for each subscriber is expected to be about $25.

1. Introduction

My subscriber-based service can enable access to many thousands of radio stations, and the audio portion of television and Internet sources which otherwise would not be easily accessible, utilizing a cell phone. The invention can receive and re-broadcast audio content. This means that whether in a car or truck, in a hotel room, or at the office, subscribers will be able to listen to content which otherwise would not have been accessible.

The invention is scaleable and powerful enough to accommodate any number of channels. It is particularly ideal for listening to conversational programs such as remote or foreign call-in show or Talk Radio. While the audio quality, especially for non-musical programs is good on cell phones, subscribers may connect their cellular device to their automobile's stereo head unit and listen through the car's sound system. This will result in a significantly improved audio experience.

Some of the easily available automobile-based installation options include a cassette player adapter, an FM transmitter made for devices like an iPod, an auxiliary audio input adapter that utilizes a headset, a Blue-tooth care kit that allows for hands free operation and listening, and by using converters and sockets in the dash offered by GM, Chrysler, Ford and Toyota now install.

Figure 5:
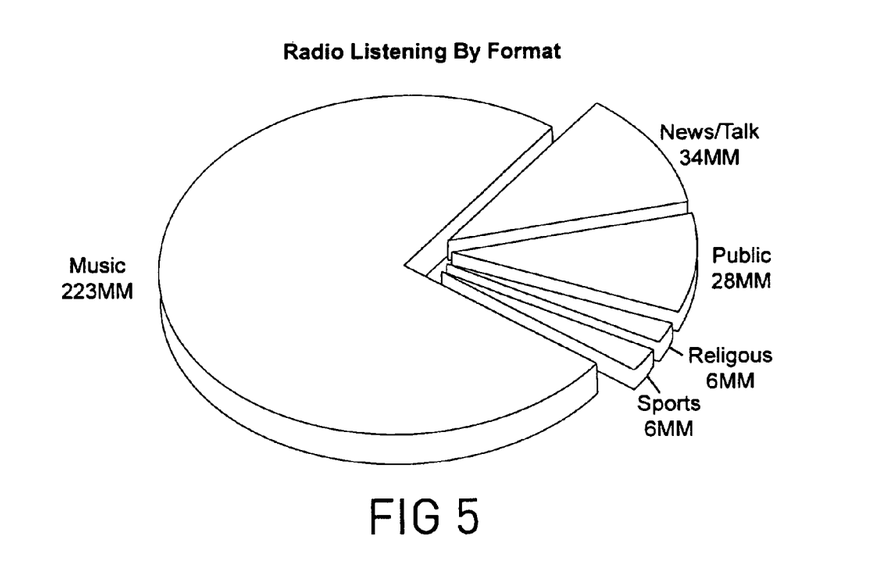
FIG. 5 shows a graph (an exploded pie chart) illustrating a break down of radio listening by format.
Figure 6:
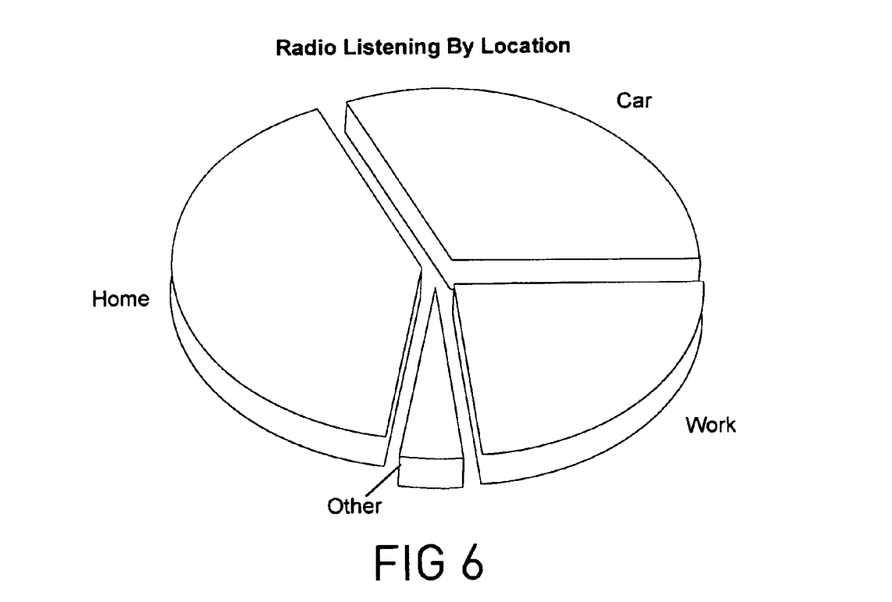
FIG. 6 shows a graph (an exploded pie chart) illustrating a break down of radio listening by location.

FIG. 5 shows a graph (an exploded pie chart) illustrating a break down of radio listening by format, and FIG. 6 shows a graph (an exploded pie chart) illustrating a break down of radio listening by location.

2. Market Overview

The market for my service is vast but generally may be presented in relation to two axes. One axis represents the attributes of the content. The other represents a subscriber's individual or group identity.

|  | Individual | Group |
|---|---|---|
| Affinity | Yes | Yes |
| Ethnic | Yes | Yes |
| Unaffiliated | Yes | Yes |

Content Segmentation

Affinity content serves those subscribers who are driven by specific topics such as religion, politics, sports, etc. . . . the invention enables this population to easily satisfy the need for staying "connected", on a 24×7 basis.

Ethnic content serves the non-English language markets. While not familiar to many Americans, there are thousands of non-English radio and television channels that currently broadcast over United States, mostly through medium powered satellites.

Unaffiliated content serves all those who are outside the affinity or ethnic markets. This type of content seeker surfs multiple channels in search of whatever may be of interest at that particular moment and selects a channel on impulse.

Subscriber Segmentation

When defined as a "one-to-many" communications system, it is plain to see that organizations or groups may use the service to deliver their content to their audience. Due to its unlimited channel ingestion and turnaround capability, the service enables any group or organization to create its own cellular channel to communicate with its members. For example, large corporations can prepare a daily cell-cast for their employees and/or customers or any of their sub-groups. Similarly, any school may create a channel to cell-cast various daily events to parents and/or students. Thus, a group of any size, whether 20 or 2,000,000 may use this service to create a channel of its own for keeping members connected. Over time, it may become the delivery platform of choice for this sizeable market.

3. Market Segmentation

Each of the aforementioned market segments represents millions of potential subscribers. The service may be organized to accommodate any or all of these segments. This section deals with subscribers with an "Individual" identity, only.

Affinity Market Segmentation

Of the tens of thousands of radio and television channels, there are over 4,750 in the United States and Canada dedicated to broadcast affinity and ethnic programming. This type of content is characterized by heavy emphasis on a specific theme such as religion, sports, or politics.

According to an article published in The Public Eye Magazine during summer 2003, one study reported that about half of the people in the United States in the year 2000 were adherents of an organized religious belief system.

| Top Affinity Markets |
| --- |
| Christian & Evangelical Groups Political Groups & Talk Shows Sports Enthusiasts Health Advocates Environmental Groups News Agencies Gay/Lesbian Groups Financial |
| TOTAL -10's of Millions |

Each of the above markets represents a large number of potential subscribers. For example, Trinity Broadcasting Network (TBN) currently reaches over 23 million homes. In aggregate, there are over 25 religious television networks that are currently broadcasting throughout United States. A mere 1% signup among this group totals 230,000 subscribers.

Ethnic Market Segmentation

The Ethnic market is comprised of many smaller markets, each with its own language and characteristics. Collectively they represent a huge market. In recent years this market has demonstrated explosive growth, mostly due to an increasing number of immigrants. According to the U.S. Census, in March 2003, the civilian population in the United States included 33.5 million foreign born, representing 11.7 percent of the U.S. population. Among the foreign born, 53.3 percent were born in Latin America, 25.0 percent in Asia, 13.7 percent in Europe, and the remaining 8.0 percent in other regions of the world.

Many immigrant households have a 30-inch dish and receiver installed at their home to receive satellite programming in their own native language. For example, there are over 20 Iranian television channels on a single satellite. They reach about 500,000 Iranian homes within the continental United States. Of course, there are thousands more ethnic channels on satellite television and the Internet.

| Top Ethnic Markets Within United States | |
| --- | --- |
| Hispanic | 30 mm |
| Chinese | 3.8 mm |
| Arabic | 3.5 mm |
| Korean | 3.2 mm |
| Greek | 3.0 mm |
| Filipino | 2 mm |
| Portuguese | 2 mm |
| African | 2 mm |
| Japanese | 2 mm |
| Iranian | 1.5 mm |
| Armenian | 1.4 mm |
| Jewish | 1.0 mm |
| Turkish | 1.0 mm |
| TOTAL | 56.4 Million |

Extrapolated from U.S. Census 2000

4. Business Strategy

A preferred model for launching its technology is a subscriber-based service. The subscribers pay a monthly recurring fee, and in exchange are granted access to the many tiers of SBC programming. This business model typically produces sufficient cash flow to be largely self-funding; especially as the number of subscribers grow. An exemplary subscription-pricing model is as follows:

| | |
| --- | --- |
| Basic Tier- Talk Radio, News and Sport | $14.95/mo |
| Affinity Tier | +$9.95/mo |
| Ethnic Radio | +$9.95/mo |
| Unlimited | $49.95/mo |

In order to create a large market, an unprecedented number of audio channels is to be offered. The use of cell phones for receiving the audio content means that these channels may be accessed without purchasing any new devices. Additionally, should cellular network providers agree to offer my inventive services to their customers, the subscription process becomes highly efficient. I may practice the following steps:

1—Acquire Content from as Many Sources as Practicable

As of June 2004, the FCC had licensed 4,771 AM stations, 6,218 commercial FM stations, and 2,497 educational FM stations. Canada has approximately 2,000 originating radio stations. The Web site radiotime.com boasts links to about 55,000 active stations. In addition, there are hundreds of ethnic TV channels broadcasting over North America.

2—Execute a Service Agreement with Cellular Network Providers

Agreement with various cellular network providers will greatly facilitate the introduction of the service, while maximizing the number of potential subscribers. The service may be provided as an optional service plan for their respective customers.

3—Rollout of the Service by Region

The service may be rolled out by individual state or region. For example, in regard to the portion of the affinity markets, which relate to Christian and evangelical groups, Preferably, initial focus is on Southern states such as Texas, Oklahoma and Arkansas which are within the "Bible Belt". Similarly, for ethnic markets, preferably, initial focus is on California and metropolitan Washington D.C., where a higher proportion of immigrants reside.

4—Develop New Technologies

Cellular Group Chat: the invention can enable multiple subscribers to communicate directly with one another in a group setting. The system manages the traffic and queues a variety of requests between participants. This is akin to an Internet chat room, but on a cellular platform. Targeted Cellcasting: the system will allow any one subscriber or a group of subscribers to be targeted for delivery of specific messages. This may be in the form of commercial advertising, or injection of emergency or other types of messages. This means that the cell-casting clients could have the ability to target individual subscribers and customize messages for each, according to a given profile.

Special services such as translation services may be provided by accessing a particular channel. Additional services such as legal advice in a specific area may be provided by accessing a particular channel. Recipes for assistance in particular types of cooking may be provided as content by accessing a particular channel through my inventive services. Other contents such as, for example, immigration news relating to specific countries of origin, may be provided by accessing a particular channel.

The content provided represents an unprecedented diversity. Its powerful reception and turnaround capabilities mean that it is has the power to offer more "hard-to-find" or "hard-to-receive" audio channels to its subscribers than may be available from free-to-air local AM/FM radio channels, cable television providers, and any of the national satellite television providers, and both digital satellite radio providers—COMBINED.

It may be helpful to note that some cellular network providers offer multimedia services that enable downloading of pod casts, music and video clips to certain types of cellular handsets. For example, Verizon's V CAST lets customers download video clips for a price and Sprint Radio provides for streaming of a limited number of channels to a handset. Watching live TV is less common. The live TV service from companies such as MobiTV and mspot typically require use of high-end handsets with built-in multimedia players, such as the SprintPCS's Samsung A900, and expensive service plans. Another service provided by UpSnap offers a variety of audio channels, but the company is primarily focused on mobile search technology via Short Message Service (SMS). The recently launched Apple iPhone is yet another example of a cellular multimedia device. The development of such devices, and the increasingly better audio quality being obtained therewith, help the service offered under the invention to be adapted to the widest types of audio content.

About Satellite Radio

Satellite radio is about the high audio fidelity that results from its digital format. However, satellite radio has a limited bandwidth and consequently may only accommodate a limited number of radio channels. Launching a new satellite is extremely expensive, typically costing $100 million or more. They also require a costly satellite management center and uplink facility. This means that only a limited number of radio broadcasters can afford this platform. This is evident by the fact that XM is limited to 156 channels and Sirius to 134 channels. The following chart offers an overview of the two services:

| XM | Sirius |
| --- | --- |
| XM service includes 73 Music channels, 39 news, talk and entertainment channels, 21 regional traffic and weather channels and 23 play-by-play sorts channels. | Sirius provides 69 streams (channels) of music and 65 streams of sports, news and entertainment to listeners. |
| XM-capable receivers cost $30-$400. If opting for the month-month plan, service fees are $12.95 for the first receiver and $6.99 each for up to four additional receivers on the same account. Subscribers may opt to purchase multi-year packages at a discount | Subscription costs for Sirius range from $12.95/mo. to $499.99 for a lifetime subscription (of the receiver, not the subscriber). A $10 activation fee if activated online ($15 if activated by phone) is also required |
| 6.89 million (as of Jul. 6, 2006). | 5.1 million (as of Oct. 4, 2006 |

Digital Satellite Broadcasters

Recently, both XM and Sirius announced an agreement to merge the two companies into one entity, subject to regulatory approval. This is further evidence that the existing satellite radio business model is very capital intensive and low margin, with a limited expansion propest.

5. Sales & Marketing

It may be advantageous to use some of the content providers to market the service offered under the invention. As referenced earlier, the ethnic groups represent promising markets. Furthermore, a portion of these listeners who currently can only tune-in through satellite or Internet, also desire to listen to the same programs in their automobile, office, or a place other than their home. As part of a carriage agreement with each broadcaster using the invention, insertion of a number of commercial spots preferably are required to be made by each broadcaster into its programming to introduce subscription service provided in accordance with the invention. The spots preferably would boast the unprecedented variety of programs accessible through an ordinary cell phone.

There are certain markets, while not visible today, that will manifest once the service is launched. For example, those who may not wish to incur the cost of installing a satellite dish at home, or pay for Internet service, may want to hear the same programs from their cellular device. Another market may be advertisers that choose to use the service as a feature to attract affinity or ethnic car buyers.

Another opportunity for using the service is with groups that may wish to deliver programs to their members. For example, there are numerous religious groups broadcasting through terrestrial radio and TV networks, as well as the Internet and satellite TV. The groups could pay for the use of the service to cell-cast pre-recorded tapes.

The use of cellular networks for delivery of radio/audio content also removes any existing geographical barriers that may exist today for the smaller station operators. For example, imagine the next Howard Stem working in a small radio station somewhere in America. My invention may be such a broadcaster's launching pad for entertainment.

6. Operational Plans

One of the pre-requisites for launching the service provided in accordance with my invention may be the formation of a scaleable Network Operations Center (NOC). With a scaleable NOC, service provided in accordance with the invention may be provided and monitored, and a full range of subscriber inquiries may be responded to. A NOC serves many purposes, including the followings:
1) House the communications backbone for inbound and outbound delivery of service to subscribers.
2) House the control servers that manage service to subscribers.
3) Reception and Turnaround of terrestrial and satellite radio, TV channels, as well as Internet stations.

In addition, adjoining areas or floors may be organized for use by the administrative staff, R&D staff, and customer service staff.

Telephony & Audio Turnaround Traffic Management

IP Telephony may be used to deliver the service to subscribers. This technology provides an added benefit of diminishing per user cost. This means that as the number of subscribers grow the cost of serving each will diminish.

In order to receive and redistribute audio channels, preferably are used to extensive use of fiber optics, multiplexers, network switches, multi-core servers and other devices are used to automate reception and delivery of the service to a large number of subscribers. In addition, circuit boards may be custom designed and fabricated to facilitate the management of telephony traffic and selection of channels for subscribers. Due to their design, these custom circuit boards also enable injection of commercial or other messages into the audio stream of any subscriber.

Subscriber Management

Preferably, databases are used to manage the subscribers. However, where feasible database and transaction processing modules preferably are used. For example, for subscriptions purchased by credit card, there are proven and reliable transaction processing modules, which are readily available for integration with a variety of database management systems.

7. Customer Service

Focusing on customer satisfaction and developing strong customer relationships is one of the major cornerstones of the business strategy. Support for subscription services preferably is provided through a customer service program and sub-contractors.

Customer service will be performed in accordance with a Customer Service Plan. Carefully selected and well-trained employees who perform customer service duties preferably follow strict rules to insure the customer service functions are properly conducted and the customer's rights are protected at all times.

8. Exposure Control

In accordance with the invention, conservative, low risk business strategies for all facets of its business are provided for cost-effective measures and financial projections to cover exposures.

Sprint/Nextel and T-Mobile, already have unlimited incoming plans which enable customers of these providers to access the service without any additional usage cost.

The invention claimed is:

1. A method of broadcasting an audio stream comprising, producing an audio stream to be transmitted by an audio transmitting apparatus, capturing the audio stream, and passing audio stream to the audio transmitting apparatus, connecting the audio transmitting apparatus with an audio stream server, the audio transmitting apparatus providing the audio stream server with the audio stream by sending signals to the audio stream server, and the audio stream server providing audio streaming services to audio transmitting apparatuses and audio transceivers connected thereto by being capable of handling multiple connections with audio transmitting apparatuses and audio transceivers and further capable of managing and executing the receipt and transmission of audio streams, transmitting the audio stream from the audio transmitting apparatus to the audio stream server, connecting an audio transceiver with the audio stream server via a telephonic connection, and passing the audio stream from the audio stream server to the audio transceiver via the telephonic connection, wherein the audio stream from a broadcaster passes from the audio transmitting apparatus to the audio stream server, the audio stream server connects with an audio transceiver via the telephonic connection, and the audio stream is then passed to the audio transceiver; and wherein the audio stream telephonic connection uses the voice band of the telephone to pass the audio stream from the audio stream server to the audio transceiver via the telephonic connection;

wherein the audio transmitting apparatus has one or more controls for controlling one or more functions of the audio transmission apparatus, and further including providing an interface that communicates with said audio stream transmitting apparatus and said audio transceiver, wherein said audio transceiver transmits control signals to said audio transmitting apparatus to control said one or more controls of said audio transmitting apparatus; and wherein the steps of producing and capturing the audio stream to be transmitted comprises speaking into a microphone, the microphone being attached to the audio transmitting apparatus for capturing audio from a speaking individual live in real time.

2. The method of claim 1, further comprising the steps of connecting a second transceiver with the audio stream server with a telephonic connection, and passing the audio stream from the audio transmitting apparatus via the audio stream server to the second transceiver via the telephonic connection, so to permit the audio stream from the audio transmitting apparatus to be passed to the transceiver and the second transceiver.

3. The method of claim 2, the audio transmitting apparatus comprising a computer, the computer being attached to or integral with the microphone for capturing the audio from a speaking individual.

4. The method of claim 3, the computer further comprising a connection for capturing audio that is prerecorded, and further comprising the step of capturing the audio that is prerecorded.

5. The method of claim 4, further comprising the steps of connecting a plurality of additional transceivers with the audio stream server with a telephonic connection, and passing the audio stream from the audio transmitting apparatus or computer via the audio stream server to the plurality of additional transceivers via the telephonic connection to permit the audio stream from the audio transmitting apparatus to be passed to the plurality of additional transceivers.

6. The method of claim 5, the transceiver, the second transceiver and the plurality of additional transceivers being telephones or cell phones.

7. The method of claim 6, further comprising receiving a request to access the audio stream from one of the telephones or cell phones.

8. The method of claim 7, the request being received by detecting a signal made by depressing a button on the one of the telephones or cell phones or by detecting speech made by a user speaking into the one, of the telephones or cell phones, or by detecting a ring on the telephonic connection that connects the telephones or cell phones with the audio stream server.

9. The method of claim 8, further comprising determining whether to pass the audio stream to the one of the telephones or cell phones.

10. The method of claim 9, wherein the determining step comprises receiving a signal made by depressing a button on the one of the telephones or cell phones or by detecting speech made by a user speaking into the one of the telephones or cell phones, and comparing the signal made by depressing a button on the one of the telephones, or speech made by a user speaking into the one of the telephones or cell phones with an access permission table to ascertain whether said signal or speech matches or does not match any said signals or speech that are listed on the access permission table.

11. The method of claim 9, wherein the determining step comprises receiving a caller identification number associated with the user telephone, and comparing the caller identification number with an access permission table to ascertain whether the caller identification number matches or does not match any of the numbers listed on the access permission table.

12. The method of claim 11, wherein the connecting an audio transmitting apparatus with an audio stream server comprises establishing an interne connection between the audio transmitting apparatus and the audio stream server.

13. The method of claim 12, further comprising normalizing, equalizing, compressing, amplifying or muting the audio stream to provide optimal sound quality to and from the telephones or cell phones.

14. The method of claim 13, further comprising passing the audio stream from the user telephone to an external speaker.

15. The method of claim 14, wherein the step of connecting the telephones or cell phones with the audio stream server is accomplished with a telephone switch.

16. The method of claim 15 further comprising providing a description of the content of the audio stream for use in a menu for presentation, in a display and/or by audible menu to an individual so the individual may know what content is being broadcasted.

17. The method of claim 16, wherein the description provided is intentionally chosen to be no description.

18. The method of claim 3, the audio transmitting apparatus comprising the first transceiver and the second transceiver, said first transceiver and second transceiver being connected to the audio stream server and capable of transmitting an audio stream to the audio stream server and receiving the audio stream from the audio stream server to allow each transceiver to chat with another of the transceivers via the connection with the audio stream server.

19. The method of claim 18, the first transceiver and the second transceiver being telephones or cell phones.

20. The method of claim 19, the audio transmitting apparatus further comprising a plurality of additional transceivers, said additional transceivers being connected to the audio stream server and capable of transmitting an audio stream to the audio stream server and receiving the audio stream from the audio stream server to allow each of the additional transceivers and the telephones or cell phones to chat with the other of the additional transceivers and the telephones or cell phones via the connection with the audio stream server.

21. The method of claim 5, the audio transmitting apparatus further comprising a first transceiver, the second transceiver, and a plurality of additional transceivers, said first transceiver, second transceiver, and plurality of additional transceivers and the computer being connected to the audio stream server and transmitting an audio stream to the audio stream server and receiving the audio stream from the audio stream server to allow each of the computer, the additional transceivers, and the telephones or cell phones to chat with the other of the computer, the additional transceivers, and the telephones or cell phones via the connection with the audio stream server.

22. The method of claim 21, the plurality of additional transceivers being telephones or cell phones.

\* \* \* \* \*